United States Patent [19]

Mussler et al.

[11] Patent Number: 4,849,930
[45] Date of Patent: Jul. 18, 1989

[54] METHOD OF COMPACTLY STORING DIGITAL DATA

[75] Inventors: James M. Mussler, Bethel Park; James A. Neuner, Richland Twp., both of Pa.

[73] Assignee: Westinghouse Electric Corp., Pittsburgh, Pa.

[21] Appl. No.: 18,896

[22] Filed: Feb. 25, 1987

[51] Int. Cl.$^4$ .............................................. G06F 15/52
[52] U.S. Cl. .............................. 364/900; 364/924.4; 364/951.1; 364/951.3; 364/555; 376/245; 376/259
[58] Field of Search ... 364/200 MS File, 900 MS File, 364/554, 555, 178, 179, 575, 577, 722, 723, 734; 376/245, 255, 259, 463

[56] References Cited

U.S. PATENT DOCUMENTS 3,698,631 10/1972 Drechsler ........................... 364/722
3,807,630 4/1974 Stewart ............................... 364/734
4,412,248 10/1983 Carmen ........................... 364/575 X
4,490,806 12/1984 Enke et al. ........................... 364/734

Primary Examiner—Eddie P. Chan
Assistant Examiner—Paul Kulik
Attorney, Agent, or Firm—R. P. Lenart

[57] ABSTRACT

A method of compactly storing digital data includes the steps of sequentially entering a plurality of digital data entries into a shift register having a plurality of stages and summing successive groups of data entries as they are outputted from the shift register to produce singly compressed data entries that are subsequently entered into a second shift register. Sets of singly compressed data entries which are outputted from the second shift register are again added to obtain doubly compressed data entries which are entered into a third shift register. This process continues until a sufficient number of shift registers have been employed to accommodate all of the expected data entries.

4 Claims, 2 Drawing Sheets

METHOD OF COMPACTLY STORING DIGITAL DATA

BACKGROUND OF THE INVENTION

This invention relates to the storage of digital data and, more particularly, to a method for compactly storing a series of digital data entries which are representative of the occurrence of a large number of random events.

The frequency of a periodic signal is typically measured by counting the number of events (pulses, zero crossings, etc.) that occur over some fixed sample period, T. If a number, C, of events are counted over a sampling interval, the measured frequency, F, of the signal is simply calculated by the equation: $F = C/T$.

This equation works well for a periodic signal, but when the number of event occurrences is varying statistically, and the number of events, C, during a sample time interval, T, is small, then inaccuracies result. The error in the measurement of frequency can be reduced to an arbitrarily small value by increasing the length of the sample interval, to a sufficiently large value. Alternatively, successive sample intervals can be averaged to produce a calculated frequency that is close to the true mean value.

This method works well as long as a sufficient number of inputs are used in the average to offset the effects of statistical variations. At low levels of occurrences, this number is quite large and at high levels this number becomes substantially reduced. The exact number of readings needed to achieve a specified accuracy can be calculated using standard statistical methods. In particular, if the random process can be modeled by a Poisson distribution, as is the case for neutron activity in a nuclear reactor, then the number of samples, N, required to meet a specified accuracy at least 95% of the time (two standard deviations) is: $N = 4/\lambda t \epsilon^2$ where, $\lambda$ is the mean number of counts occurring in a one second interval, t is the basic sampling period in seconds, and $\epsilon$ is the specified relative error.

The response time of a measuring instrument to a change in frequency of incoming pulses is directly related to the number of input samples used to calculate pulse frequency. If N sampls are used in the calculation, then the response time of the instrument will simply be N sample times. Therefore, accuracy and response time can be traded off in a straightforward manner.

Within a nuclear reactor, neutron activity is an indication of power being generated by the reactor. An indication of both the power and the rate of change of power within the reactor is important for both control and safety systems. The rate of change of neutron activity is usually indicated as the exponential rate of change (typically in decades per minute). The equation for the exponential rate of change of neutron activity is given by:

$$\text{Rate} = (\log (F_2) - \log (F_1)/T \quad \text{or} \quad (1)$$

$$\text{Rate} = (\log (F_2/F_1))/T \quad (2)$$

where $F_1$ and $F_2$ are consecutive measurements of the frequency of neutron activity and T is the sample interval between the two frequency measurements. The resulting rate has units of decades per sample interval.

An instrument, typically referred to as the source range instrument, designed to cover the range of neutron activity from a few pulses per second to millions of pulses per second, must meet two general design criteria with respect to the measurement of both the frequency of neutron activity (level) and the rate of change in frequency of neutron activity (rate). First, to provide the required accuracy and stability of measurement, the instrument must use a sufficiently long sampling interval so that the variations in the reading due to the random nature of neutron activity are minimized. Second, to provide adequate response time, the instrument must provide an accurate, stable reading in a timely fashion. The response time requirements generally vary over the operating range of the instrument from tens of seconds at the low end to one second or less at the upper operating range. Different response times are also generally specified depending on the type of input presented to the instrument. For example, the response time requirements may be separately specified for exponetially increasing inputs and step change inputs.

In addition, the instrument may also be required to distinguish between exponential changes in inputs and step changes in inputs. This feature may be required so that the small step change in the input does not produce an indication of an abnormally high rate of change that may needlessly cause a trip in the reactor.

To perform the required level and rate calculations, historical neutron activity data is required. If for example, $x_1, x_2 \ldots, x_{16,640}$ represent the number of counts received during the most recent 100 millisecond sample period, the next most recent 100 millisecond sample period, and so on to the oldest sample, then an estimate of the mean value of the level, L is calculated from the equation:

$$L = 10(x_1 + \ldots x_N)/N \quad (3)$$

where L has units of counts per second.

The value of N (and thus the effective sampling time of the instrument for the level measurement) may be dynamically adjusted to meet the required accuracy response time and statistical stability of the source range instrument.

For the frequency calculation, the rate is calculated according to the equation:

$$R = (600/M) \log (S_1/S_2) \quad (4)$$

where $S_1$ is the sum of the last M historical terms (1 to M) and $S_2$ is the number of the next M historical terms (M+1 to 2M) where M is the number of terms used for each summation. With a sample period of 100 milliseconds, R will have units of decades per minute. Here again, the value of M (the effective sampling time of the instrument for the rate measurement) may be dynamically adjusted to meet the required accuracy, response time and statistical stability of the source range instrument.

To meet the specified accuracy and stability requirements for the instrument, a large number, for example at least 15,000, of historical data samples must be stored to perform the required calculations. In order to eliminate the need for excessive memory in the instrument, a method for storing this data in a compact manner is required.

SUMMARY OF THE INVENTION

This invention provides a method of storing digital data in a compact manner which includes the steps of sequentially entering a plurality of digital data entries into a first shift register having a plurality of stages and summing a preselected number of these data entries which are forced out of the shift register as new data is entered. The resulting summations become compressed data entries in a second shift register which also has a plurality of stages. As these compressed data entries are entered into the second shift register, a predetermined number of the compressed data entries which are forced out of the other end of the second shift register are again summed to produce a plurality of doubly compressed data entries which are stored in a third shift register.

Additional shift registers may be added and additional summing steps may be performed to provide sufficient data storage for the anticipated number of initial data entries. Each successive shift register stores data in a more highly compressed form than the previous register.

DESCRIPTION OF THE PREFERRED EMBODIMENT

Figure 1:
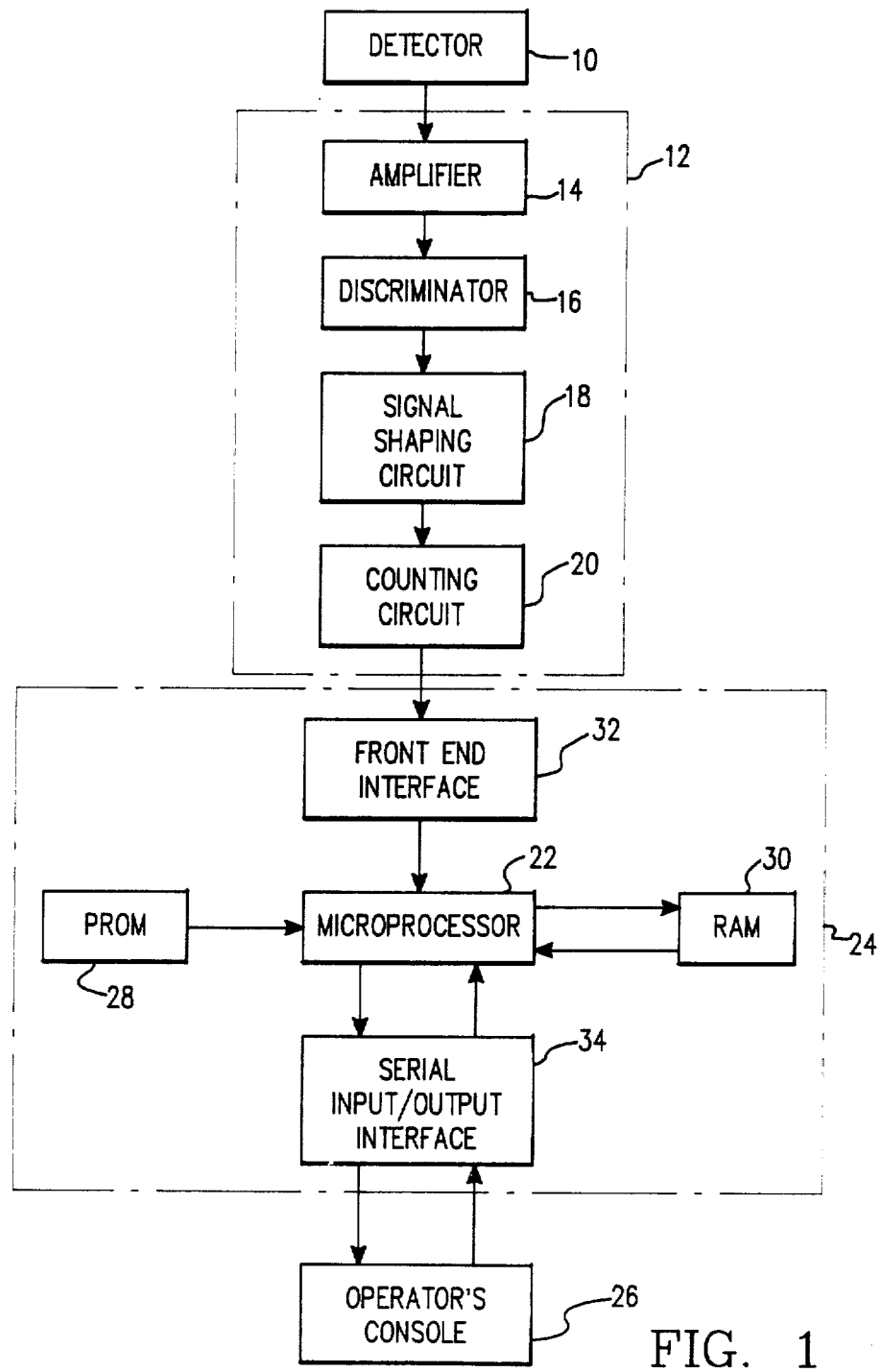
FIG. 1 is a block diagram of a source range instrument which may be used to perform the method of the present invention.

Referring to the drawings, FIG. 1 is a block diagram of a source range instrument for a nuclear reactor monitoring system which may be used to practice the method of this invention. A suitable neutron detector 10 is used to generate a pulse of current each time a neutron enters the detector. The front end circuitry 12 of the source range instrument includes an amplifier 14, a discriminator 16, a signal shaping circuit 18 and a counting circuit 20. The amplifier amplifies the detector current. The discriminator distinguishes between current pulses due to neutron activity and pulses caused by external noise in the system, by comparing the pulses to a fixed amplitude threshold. Pulses which pass the discriminator are shaped by the signal shaping circuit and passed to the counting circuit. The counting circuit 20 counts pulses for a fixed period, of for example 100 milliseconds, and then interrupts a microprocessor 22 in a microcomputer 24. The counting circuit is double buffered so that counting can continue during the next sampling period while the microprocessor performs its tasks to determine the frequency of the incoming pulses and the rate of change of frequency of the incoming pulses, and to display the results on an operator console 26. The microcomputer 24 includes standard components such as an Intel 8086 microprocessor 22, suitable programmable read only memory 28 and random access memory 30 and suitable digital parallel and serial interface circuits 32 and 34 to provide communications between the microprocessor and the front end circuit and the operator's console.

When the processor receives the interrupt signal from the front end counting circuit, the processor reads the total number of counts that occur during the previous sampling period. This sample is stored in a table in a random access memory that contains a historical record of the number of counts received for a fixed number of preceding samples, for example 16,640.

In general, the data is stored as a three byte integer number of counts in one of several buffers. Each buffer includes a shift register and a holding register and each successive buffer stores data in a more highly compressed form than the previous buffer.

Figure 2:
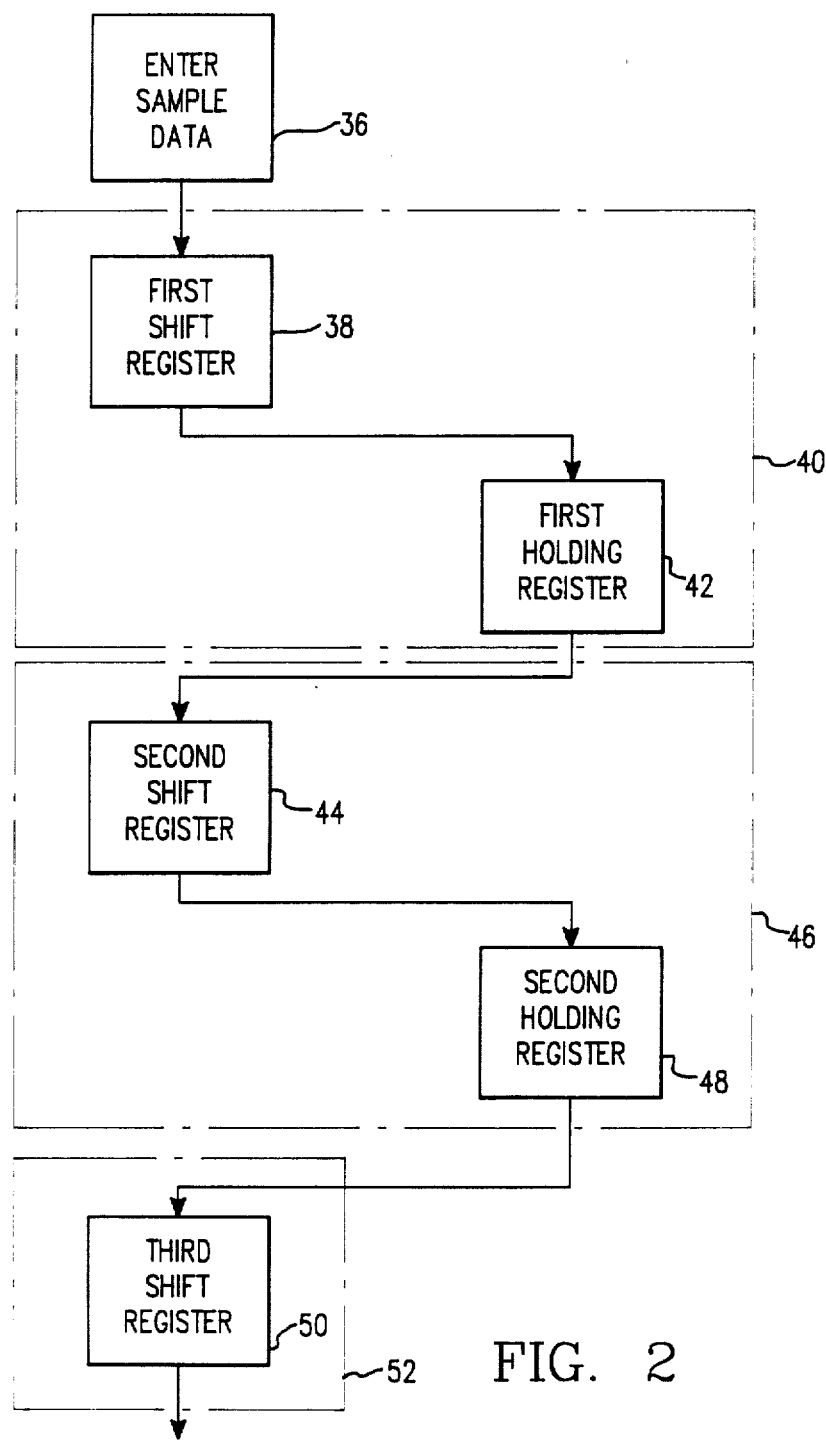
FIG. 2 is a flow diagram which illustrates the present invention method.

FIG. 2 is a flow diagram which illustrates the data storage and compression method of this invention. As shown in block 36, a digital data entry, which may represent a sample neutron count for a predetermined sample period, is entered into the top of a multiple stage shift register 38 in the first buffer 40. When this occurs, all previous data entries in shift register 38 are pushed down one position. The last entry is pushed out of the bottom of the shift register and transferred to a first holding register 42 in the first buffer. This data entry is summed with the contents of the first holding register. When $k_1$ entries have been summed by holding register 42, that sum becomes a singly compressed data entry for the second shift register 44 in the second buffer 46. Thus, each entry in the second buffer shift register 44 represents the sum of $K_1$ consecutive entries from the first buffer 40. After the contents of the holding register 42 are entered into the second shift register 44, the first holding register 42 is cleared. This procedure continues with each subsequent buffer such that the second holding register 48 sums $K_2$ consecutive entries from the second shift register 44 to form doubly compressed data entries which are entered into the third shift register 50 in the third buffer 52. Additional buffers may be added depending upon the amount of data storage required with, each entry in a fourth buffer consisting of a sum of $k_3$ entries from buffer 52 and each entry of a fifth buffer consisting of the sum of $k_4$ entries fromt he fourth buffer and so on through the last buffer. Thus if the first buffer contains $e_1$ entries and the second buffer contains $e_2$ entries then the total number of data samples stored in these buffers will be $e_1 + k_1 e_2$. If $e_1, \ldots, e_n$ are the number of entries in buffers 1 to n respectively, then the total number of samples, E, that are stored is:

$$E = e_1 + k_1 e_2 + k_1 k_2 e_3 + \ldots k_1 \ldots k_{n-1} e_n$$

The total memory required to store this number of samples in this compressed format is just $b(e_1 + \ldots + e_n)$ bytes, where b is the number of bytes required for each entry. This compares with b*E bytes of storage which would be required if the samples were stored in uncompressed form. A typical source range instrument for use in a nuclear reactor monitoring system may include nine buffers with values of $k_1 = k_2 = \ldots = k_8 = 2$ and $e_1$, being 128, 128, 32, 32, 32, 32, 32, 32, and 32 respectively. Thus a total of 16,640 samples can be stored in only 480 entries. Of course, it should be noted that the values used for k need not be equal and similarly, the number of entries in each buffer need not be the same.

Since the degree of data compression places some restriction on the values of N and M in equations 3 and 4 used in the level and rate calculations, as well as in the update period for the rate calculation, the values of $k_i$ and $e_i$ must be carefully chosen so that the overall performance of the instrument is not degraded.

This method of compactly storing data allows the low frequency operating range of a source range instrument to be greatly expanded without increasing its required data storage space. Although this invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A method of storing digital data, representative of neutron activity in a nuclear reactor, in a compressed format, comprising the steps of:

generating a plurality of current pulses in response to neutrons entering a neutron detector;

counting said current pulses during successive sampling time periods to produce a plurality of digital data entries;

sequentially entering said plurality of digital data entries into a first shift register having a plurality of stages;

summing a first preselected number ($k_1$) of successive ones of said digital data entries to obtain a singly compressed data entry for each set of $K_1$ digital data entries;

sequentially entering said singly compressed data entries into a second shift register having a plurality of stages;

summing a second preselected number ($k_2$) of successive ones of said singly compressed data entries to obtain a doubly compressed data entry for each set of $k_2$ singly compressed data entries; and sequentially entering said doubly compressed data entries into a third shift register having a plurality of stages.

2. The method of claim 1, wherein the step of summing a first preselected number of successive ones of said digital data entries comprises the steps of:

transferring one of said digital data entries from an output stage of first shift register to a holding register for each of said digital entries entered in an input stage of said first shift register; and adding said first preselected number $k_1$ of said digital data entries transferred to said holding register to obtain one of said singly compressed data entries.

3. The method of claim 2, wherein the step of summing a second preselected number of successive ones of said singly compressed data entries comprises the steps of:

transferring one of said singly compressed data entries from an output stage of said second shift register to a second holding register for each of said singly compressed data entries entered in an input stage of said second shift register; and adding said second preselected number $k_2$ of said compressed data entries transferred to said second holding register to obtain one of said doubly compressed data entries.

4. The method of claim 3, wherein said first and second preselected numbers are equal.

* * * * *